US012052165B2

(12) United States Patent
Zhuang et al.

(10) Patent No.: US 12,052,165 B2
(45) Date of Patent: *Jul. 30, 2024

(54) FAULT DIAGNOSIS METHOD AND APPARATUS THEREOF

(71) Applicant: HUAWEI TECHNOLOGIES CO., LTD., GuangDong (CN)

(72) Inventors: Shunwan Zhuang, Beijing (CN); Zhenbin Li, Beijing (CN); Shiping Xu, Shenzhen (CN); Kai Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,782

(22) Filed: Sep. 19, 2022

(65) Prior Publication Data

US 2023/0010837 A1 Jan. 12, 2023

Related U.S. Application Data

(63) Continuation of application No. 17/013,837, filed on Sep. 7, 2020, now Pat. No. 11,463,349, which is a (Continued)

(30) Foreign Application Priority Data

Mar. 9, 2018 (CN) .......................... 201810198167.1

(51) Int. Cl.
 *H04L 45/28* (2022.01)
 *H04L 41/0677* (2022.01)
 (Continued)

(52) U.S. Cl.
 CPC .......... *H04L 45/28* (2013.01); *H04L 41/0677* (2013.01); *H04L 43/10* (2013.01);
 (Continued)

(58) Field of Classification Search
 CPC ..... H04L 45/28; H04L 41/0677; H04L 43/10; H04L 43/50; H04L 45/02; H04L 45/42
 See application file for complete search history.

(56) References Cited

U.S. PATENT DOCUMENTS 6,173,324 B1 1/2001 D'Souza
7,466,661 B1 12/2008 Previdi et al.
(Continued)

FOREIGN PATENT DOCUMENTS

CN 101562531 A 10/2009
CN 102404155 A 4/2012
(Continued)

OTHER PUBLICATIONS

C.Hedrick, "Routing Information Protocol", Network working Group, RFC 1058, Jun. 1988, 33 Pages.
(Continued)

*Primary Examiner* — Mohamed A. Wasel
*Assistant Examiner* — Jihad K Boustany
(74) *Attorney, Agent, or Firm* — Rimon PC

(57) ABSTRACT

Various embodiments provide a fault diagnosis method and an apparatus. In those embodiments, a centralized management apparatus receives a first packet from a first network device by using a first IGP monitoring protocol session, where the first packet includes a first message sent by the first network device to a second network device. The centralized management apparatus receives a second packet from the second network device through a second IGP monitoring protocol session, where the second packet includes a second message sent by the second network device to the first network device. The centralized management apparatus performs fault diagnosis based on the first packet and the second packet.

14 Claims, 8 Drawing Sheets

Related U.S. Application Data continuation of application No. PCT/CN2019/077017, filed on Mar. 5, 2019.

(51) Int. Cl.
*H04L 43/10* (2022.01)
*H04L 43/50* (2022.01)
*H04L 45/02* (2022.01)
*H04L 45/42* (2022.01)

(52) U.S. Cl.
CPC .............. *H04L 43/50* (2013.01); *H04L 45/02* (2013.01); *H04L 45/42* (2013.01)

(56) References Cited

U.S. PATENT DOCUMENTS

| | | | |
|---|---|---|---|
| 8,014,275 B1 | 9/2011 | Sundt et al. | |
| 9,705,769 B1* | 7/2017 | Sarangapani | H04L 9/3242 |
| 2006/0114838 A1 | 6/2006 | Mandavilli et al. | |
| 2011/0235525 A1* | 9/2011 | Nishi | H04L 43/091 370/242 |
| 2012/0075995 A1* | 3/2012 | Welin | H04L 43/0876 370/235 |
| 2016/0330046 A1* | 11/2016 | Yang | H04L 12/4641 |
| 2017/0201942 A1* | 7/2017 | Mathews | H04M 1/72412 |
| 2021/0211376 A1* | 7/2021 | Chen | H04L 45/24 |

FOREIGN PATENT DOCUMENTS

| | | |
|---|---|---|
| CN | 103442386 A | 12/2013 |
| CN | 103703722 A | 4/2014 |
| CN | 108599980 A | 9/2018 |

OTHER PUBLICATIONS

Ross W. Callon, "Use of OSI ISIS for Routing in TCP/IP and Dual Environments", Network Working Group, RFC 1195, Dec. 1990, total 68 pages.

K. McCloghrie et al, "Management Information Base for Network Management of TCP/IP-based internets: MIB-II", Network Working Group, RFC 1213, Mar. 1991, total 70 pages.

J. Moy, "OSPF Version2", Network Working Group, RFC 1583, Mar. 1994, 132 Pages.

J. Scudder et al, "BGP Monitoring Protocol (BMP)",Internet Engineering Task Force (IETF), RFC 7854, Jun. 2016, total 27 pages.

Y. Gu et al, "Network Monitoring Protocol (NMP) draft-gu-network-mornitoring-protol-00", Network Working Group Internet-Draft, Jul. 2, 2018, total 16 pages.

Yunan Gu et al, "Network Monitoring Protocol (NMP) draft-gu-network-monitoring-protocol-00", Jul. 7, 2018, total 12 pages.

* cited by examiner

| Protocol message type | Monitored content or packet usage | Packet format |
|---|---|---|
| Type = 0: link state packet monitoring | Batch and real-time reporting of a link state PDU: Batch reporting: When an IGP monitoring protocol starts to be established, all LSPs of a network device are reported to a centralized management apparatus at one time. Real-time reporting: After the batch reporting is completed, when the LSP of the network device changes, the changed LSP is reported to the centralized management apparatus in real time. | Common message header and link state packet |
| Type = 1: neighbor discovery | Neighbor discovery event: The neighbor discovery event includes the following: (1) An active neighbor is discovered. (2) An active neighbor withdraws. (3) A configuration parameter of a neighbor changes. | Common message header and Hello packet |

FIG. 3

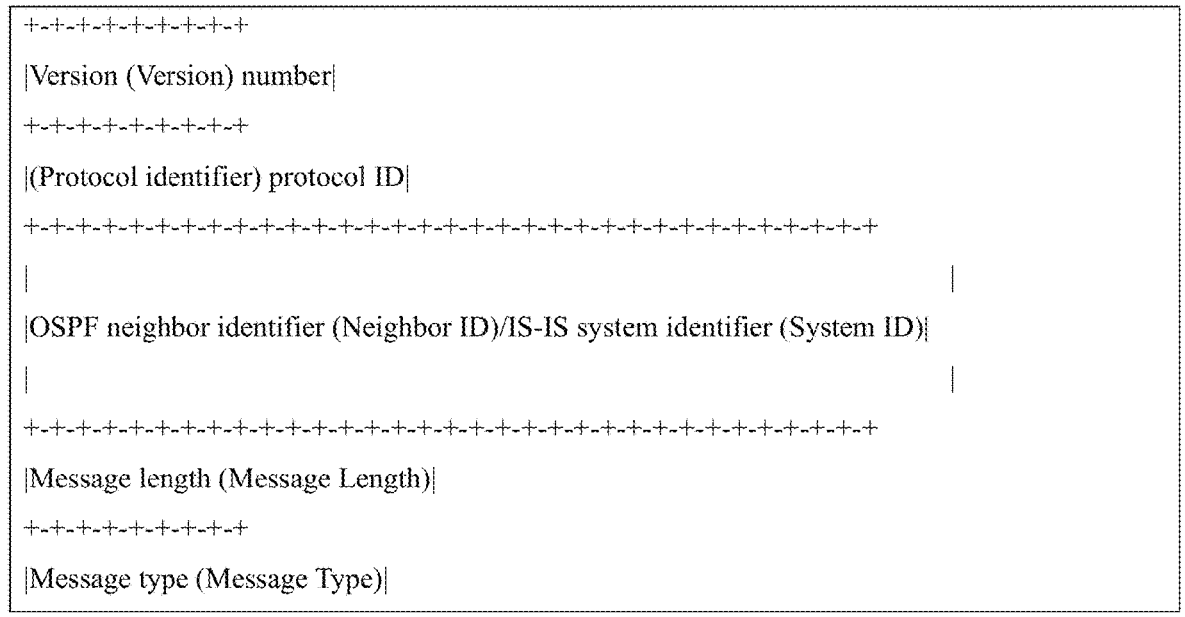

FIG. 4

FAULT DIAGNOSIS METHOD AND APPARATUS THEREOF

CROSS-REFERENCE TO RELATED APPLICATIONS

This application is a continuation of U.S. patent application Ser. No. 17/013,837 filed on Sep. 7, 2020, which is a continuation of International Application No. PCT/CN2019/077017 filed on Mar. 5, 2019, which claims priority to Chinese Patent Application No. 201810198167.1, filed on Mar. 9, 2018. All of the aforementioned patent applications are hereby incorporated by reference in their entireties.

TECHNICAL FIELD

Various embodiments relate to the field of communications technologies, and in particular, to a fault diagnosis method and an apparatus thereof.

BACKGROUND

The Internal Gateway Protocol (IGP) is a protocol used to exchange data flow forwarding channel information between gateways in an autonomous system (for example, an autonomous system in a local community). In the Internet Protocol (IP) or another network protocol, the channel information is usually used to determine how to transmit a data flow. The gateway may be a host or a router. IGP may include the Routing Information Protocol (RIP), the open shortest path first (OSPF) protocol, the intermediate system to intermediate system (IS-IS) protocol, and the like.

In a network using IGP, a fault such as a failure of establishing a connection between a router 1 and a router 2 or a failure of route learning may occur. The router 1 and the router 2 are neighbors to each other in the network. Currently, a manual fault diagnosis method is used to determine a fault. To be specific, an administrator enters a command line on each router in a network to query IGP state information and neighbor state information, so as to determine that the network is faulty. This manual fault diagnosis method depends on judgment of the administrator, and therefore a relatively long time is consumed. Frequent queries affect normal working efficiency of the router or even cause the router to break down.

SUMMARY

To resolve a technical problem, various embodiments provide a fault diagnosis method and an apparatus thereof, so that disadvantages of a manual fault diagnosis method can be overcome, a time consumed for fault diagnosis can be shortened, and impact on normal working efficiency of a network device can be reduced.

A first aspect of the various embodiments provides a fault diagnosis method, including:

receiving, by a centralized management apparatus, a first packet from a first network device by using a first IGP monitoring protocol session, where the first packet includes a first message sent by the first network device to a second network device; receiving, by the centralized management apparatus, a second packet from the second network device by using a second IGP monitoring protocol session, where the second packet includes a second message sent by the second network device to the first network device, and a message type of the second message is the same as that of the first message; and performing, by the centralized management apparatus, fault diagnosis based on the first packet and the second packet.

According to the first aspect, the centralized management apparatus receives the first packet from the first network device and the second packet from the second network device by using the IGP monitoring protocol sessions, and performs fault diagnosis based on the first packet and the second packet, so that the centralized management apparatus performs fault diagnosis, to shorten a time consumed for fault diagnosis, and reduce impact on normal working efficiency of the network device.

The first network device and the second network device are used as examples. The centralized management apparatus may actually perform fault diagnosis based on a packet sent by each of a plurality of network devices.

With reference to the first aspect, in one example implementation, the first message and the second message are messages of a same type, to be specific, both are neighbor discovery messages, both are link state database information, both are other messages, or the like. Because the first message and the second message are the messages of the same type, protocol message types of the first packet and the second packet are the same, so that the centralized management apparatus detects whether the first packet and the second packet meet a packet rule. It may be understood that the centralized management apparatus performs fault diagnosis only when the protocol message types of the first packet and the second packet are the same.

With reference to the first aspect, in one example implementation, the centralized management apparatus performs fault diagnosis when the first packet and the second packet do not meet a packet rule, so that the centralized management apparatus can determine a fault. The fault may be a fault on the first network device, may be a fault on the second network device, may be a fault on a connection between the first network device and the second network device, in other words, the connection between the first network device and the second network device cannot be established, may be a route learning fault, in other words, route learning of the first network device or the second network device fails, or the like.

With reference to the first aspect, in one example implementation, when the first message and the second message are neighbor discovery messages, the packet rule is an IGP connection establishment rule. The neighbor discovery message includes at least one of an authentication manner, a system identifier, an intermediate system to intermediate system IS-IS level, and a maximum transmission unit value. The IGP connection establishment rule includes a rule that authentication manners at two ends of a link need to be matched, a rule that system identifiers at the two ends of the link need to be different, a rule that IS-IS levels at the two ends of the link need to be matched, and a rule that maximum transmission unit values at the two ends of the link need to be the same. The centralized management apparatus detects whether at least one of a pair of authentication manners, a pair of system identifiers, a pair of IS-IS levels, and a pair of maximum transmission unit values of the first network device and the second network device meets the IGP connection establishment rule; and when the at least one of a pair of authentication manners, a pair of system identifiers, a pair of IS-IS levels, and a pair of maximum transmission unit values of the first router and the second network device does not meet the IGP connection establishment rule, determines that the first packet and the second packet do not meet the packet rule. The centralized management apparatus may determine that there is a fault that a connection between the first network device and the second network device cannot be established. To be specific, when the first message and the second message are the neighbor discovery messages, and the first packet and the second packet do not meet the packet rule, the centralized management apparatus may determine a fault type through diagnosis, namely, the fault that the connection between the first network device and the second network device cannot be established.

With reference to the first aspect, in one example implementation, when the first message carries an authentication manner of the first network device, and the second message carries an authentication manner of the second network device, the IGP connection establishment rule is that the authentication manners at the two ends of the link need to be the same. The authentication manner is an interface authentication manner. The centralized management apparatus detects whether the authentication manner of the first network device matches the authentication manner of the second network device. If the authentication manner of the first network device does not match the authentication manner of the second network device, the centralized management apparatus may determine that the first packet and the second packet do not meet the packet rule.

In this implementation, the centralized management apparatus may further determine that a fault cause is that the authentication manner of the first network device does not match the authentication manner of the second network device. Therefore, an administrator adjusts the authentication manner of the first network device or the second network device, so that the authentication manner of the first network device matches the authentication manner of the second network device, to meet the IGP connection establishment rule, and help establish the connection between the first network device and the second network device.

With reference to the first aspect, in one example implementation, when the first message carries a system identifier of the first network device, and the second message carries a system identifier of the second network device, the IGP connection establishment rule is that the system identifiers at the two ends of the link need to be different. The centralized management apparatus detects whether the system identifier of the first network device is the same as the system identifier of the second network device. If the system identifier of the first network device is the same as the system identifier of the second network device, the centralized management apparatus may determine that the first packet and the second packet do not meet the packet rule.

In this implementation, the centralized management apparatus may further determine that a fault cause is that the system identifier of the first network device is the same as the system identifier of the second network device. Therefore, an administrator adjusts the system identifier of the first network device or the second network device, so that the system identifier of the first network device is different from the system identifier of the second network device, to meet the IGP connection establishment rule, and help establish the connection between the first network device and the second network device.

With reference to the first aspect, in one example implementation, when the first message carries an IS-IS level of the first network device, and the second message carries an IS-IS level of the second network device, the IGP connection establishment rule is that the IS-IS levels at the two ends of the link need to be matched. The centralized management apparatus detects whether the IS-IS level of the first network device matches the IS-IS level of the second network device. If the IS-IS level of the first network device does not match the IS-IS level of the second network device, the centralized management apparatus may determine that the first packet and the second packet do not meet the packet rule.

In this implementation, the centralized management apparatus may further determine that a fault cause is that the IS-IS level of the first network device does not match the IS-IS level of the second network device. Therefore, an administrator adjusts the IS-IS level of the first network device or the second network device, so that the IS-IS level of the first network device matches the IS-IS level of the second network device, to meet the IGP connection establishment rule, and help establish the connection between the first network device and the second network device.

With reference to the first aspect, in one example implementation, when the first message carries a maximum transmission unit value of the first network device, and the second message carries a maximum transmission unit value of the second network device, the IGP connection establishment rule is that the maximum transmission unit values at the two ends of the link need to be the same. The centralized management apparatus detects whether the maximum transmission unit value of the first network device is the same as the maximum transmission unit value of the second network device. If the maximum transmission unit value of the first network device is different from the maximum transmission unit value of the second network device, the centralized management apparatus may determine that the first packet and the second packet do not meet the packet rule.

In this implementation, the centralized management apparatus may further determine that a fault cause is that the maximum transmission unit value of the first network device is different from the maximum transmission unit value of the second network device. Therefore, an administrator adjusts the maximum transmission unit value of the first network device or the second network device, so that the maximum transmission unit value of the first network device is the same as the maximum transmission unit value of the second network device, to meet the IGP connection establishment rule, and help establish the connection between the first network device and the second network device.

With reference to the first aspect, in one example implementation, the centralized management apparatus generates information about adjusting a maximum transmission unit value if the maximum transmission unit values of the first network device and the second network device do not meet the IGP connection establishment rule, and the maximum transmission unit value of the first network device or the second network device is less than a maximum transmission unit threshold. The information about adjusting a maximum transmission unit value is used to instruct an administrator to adjust the maximum transmission unit value of the first network device or the second network device. For example, the centralized management apparatus generates and outputs the information about adjusting a maximum transmission unit. When obtaining the information, the administrator queries the maximum transmission unit values of the two network devices, to determine whether to adjust the maximum transmission unit value of the first network device or the second network device, so as to optimize running of IGP.

With reference to the first aspect, in one example implementation, when determining that there is the fault that the connection between the first network device and the second network device cannot be established, the centralized management apparatus generates alarm information to indicate the fault, so that an administrator performs corresponding adjustment. The alarm information may carry a fault cause, so that the administrator performs targeted adjustment based on the fault cause.

The administrator does not need to compare information obtained from network devices to determine the fault cause. When determining that there is the fault, the centralized management apparatus can determine the fault cause based on the first packet and the second packet, to improve intelligence and flexibility of the centralized management apparatus.

With reference to the first aspect, in one example implementation, the first message and the second message are link state database information, and the link state packet database information includes at least one link state packet. The centralized management apparatus detects whether at least one link state packet included in the first packet is consistent with at least one link state packet included in the second packet; and when the at least one link state packet included in the first packet is inconsistent with the at least one link state packet included in the second packet, determines that the first packet and the second packet do not meet the packet rule. In this case, the packet rule is that link state database information included in the first packet needs to be consistent with link state database information included in the second packet.

The centralized management apparatus may determine that there is a route learning fault. The route learning fault is that route learning of the first network device or the second network device fails.

With reference to the first aspect, in one example implementation, if the at least one link state packet included in the first packet does not match the at least one link state packet included in the second packet, the centralized management apparatus determines that the first packet and the second packet do not meet the packet rule.

If a link state packet 1 sent by the first network device includes an IP prefix P1, in other words, the link state packet 1 of the first packet carries the IP prefix P1, but when the first network device synchronizes the link state packet 1 to the second network device, the IP prefix P1 is not carried in the link state packet 1, in other words, the link state packet 1 of the second packet does not carry the IP prefix P1. In this case, the centralized management apparatus may determine that the at least one link state packet included in the first packet does not match the at least one link state packet included in the second packet.

If a link state packet 1 sent by the first network device includes an IP prefix P1, in other words, the link state packet 1 of the first packet carries the IP prefix P1, but when the first network device synchronizes the link state packet 1 to the second network device, the link state packet 1 carries an IP prefix P2 in addition to the IP prefix P1, in other words, the link state packet 1 of the second packet carries the IP prefixes P1 and P2. In this case, the centralized management apparatus may determine that the at least one link state packet included in the first packet does not match the at least one link state packet included in the second packet.

In this implementation, the centralized management apparatus may further determine that a fault cause of the route learning fault is that a routing prefix sent by the first network device or the second network device is incorrect, so that the administrator handles the fault in time. For example, if the link state packet 1 of the first packet carries the IP prefix P1, and the link state packet 1 of the second packet does not carry the IP prefix P1, or the link state packet 1 of the second packet carries the IP prefixes P1 and P2, the centralized management apparatus may determine that the fault cause is that the routing prefix sent by the first network device is incorrect.

With reference to the first aspect, in one example implementation, if the at least one link state packet included in the first packet does not include the at least one link state packet included in the second packet, or the at least one link state packet included in the second packet does not include the at least one link state packet included in the first packet, in other words, the at least one link state packet sent by one network device cannot be found on the other network device, the centralized management apparatus determines that the first packet and the second packet do not meet the packet rule. For example, if the first packet includes a link state packet 1 and a link state packet 2, and the link state packet 1 is a packet generated by the first network device, but the second packet does not include the link state packet 1, the centralized management apparatus determines that the first packet and the second packet do not meet the packet rule.

In this implementation, the centralized management apparatus may further determine that a fault cause of the route learning fault is that a link state packet received by the first network device or the second network device is incorrect, so that the administrator handles the fault in time. For example, if the first packet includes a link state packet 1 and a link state packet 2, and the link state packet 1 is a packet generated by the first network device, but the second packet does not include the link state packet 1, the centralized management apparatus may determine that the fault cause is that the link state packet received by the second network device is incorrect, in other words, the second network device does not receive the link state packet 1.

With reference to the first aspect, in one example implementation, when determining that there is the route learning fault, the centralized management apparatus generates alarm information to indicate the fault, so that the administrator handles the fault in time.

The administrator does not need to compare information obtained from network devices to determine the fault cause. When determining that there is the fault, the centralized management apparatus can determine the fault cause based on the first packet and the second packet, to improve intelligence and flexibility of the centralized management apparatus.

With reference to the first aspect, in one example implementation, before receiving a packet from a network device by using the IGP monitoring protocol session, the centralized management apparatus establishes the IGP monitoring protocol session with the network device, so that the network device can send the packet to the centralized management apparatus, to help the centralized management apparatus perform fault diagnosis.

A procedure of establishing the first IGP monitoring protocol session is used as an example. The procedure may include: configuring, by the centralized management apparatus, a first IP address used to establish the IGP monitoring protocol session and a transmission control protocol TCP port number; receiving a TCP connection establishment request from the first network device by using the TCP port number, where the TCP connection establishment request includes a second IP address that is used to establish the IGP monitoring protocol session and that is configured by the first network device; and establishing the first IGP monitoring protocol session between the centralized management apparatus and the first network device.

A second aspect of the various embodiments provides a fault diagnosis method, including:

encapsulating, by a first network device, a message by using an IGP monitoring protocol, to obtain a packet, where the message is a message sent by the first network device to a second network device; and sending, by the first network device, the packet to a centralized management apparatus by using an IGP monitoring protocol session.

According to the second aspect, the first network device encapsulates the message by using the IGP monitoring protocol, to obtain the packet, and sends the packet to the centralized management apparatus by using the IGP monitoring protocol session, so that the centralized management apparatus performs fault diagnosis based on packets sent by network devices.

With reference to the second aspect, in one example implementation, the first network device configures a second IP address used to establish the IGP monitoring protocol session, and a first IP address used to establish the IGP monitoring protocol session and a TCP port number that are configured by the centralized management apparatus; and sends a TCP connection establishment request to the centralized management apparatus by using the TCP port number, where the TCP connection establishment request includes the second IP address, and the TCP connection establishment request is used to establish the IGP monitoring protocol session, so that the centralized management apparatus establishes the IGP monitoring protocol session, and the first network device sends the packet to the centralized management apparatus by using the IGP monitoring protocol session.

It should be noted that the first network device may be any router in an IGP domain.

A third aspect of the various embodiments provides a centralized management apparatus. The centralized management apparatus has a function of implementing the method according to the first aspect. The function may be implemented by hardware, or may be implemented by hardware executing corresponding software. The hardware or the software includes one or more units corresponding to the foregoing function.

In one example implementation, the centralized management apparatus includes a transceiver unit and a processing unit. The transceiver unit is configured to receive a first packet from a first network device by using a first interior gateway protocol IGP monitoring protocol session, where the first packet includes a first message sent by the first network device to a second network device. The transceiver unit is further configured to receive a second packet from the second network device by using a second IGP monitoring protocol session, where the second packet includes a second message sent by the second network device to the first network device, and a message type of the second message is the same as that of the first message. The processing unit is configured to perform fault diagnosis based on the first packet and the second packet.

In one example implementation, the centralized management apparatus includes a processor, a transceiver, and a memory. The transceiver is configured to: receive and send information, the memory stores a computer executable instruction, the processor is connected to the memory and the transceiver by using a bus, and the processor executes the computer executable instruction stored in the memory, so that the centralized management apparatus performs the following operations: receiving a first packet from a first network device by using a first interior gateway protocol IGP monitoring protocol session, where the first packet includes a first message sent by the first network device to a second network device; receiving a second packet from the second network device by using a second IGP monitoring protocol session, where the second packet includes a second message sent by the second network device to the first network device, and a message type of the second message is the same as that of the first message; and performing fault diagnosis based on the first packet and the second packet.

Based on a same inventive concept, for a problem-resolving principle and beneficial effects of the centralized management apparatus, refer to the method in the first aspect and beneficial effects brought by the method. Therefore, for implementation of the centralized management apparatus, refer to the implementation of the method. Repeated parts are not described again.

A fourth aspect of the various embodiments provides a first network device. The first network device has a function of implementing the method according to the second aspect. The function may be implemented by hardware, or may be implemented by hardware executing corresponding software. The hardware or the software includes one or more units corresponding to the foregoing function.

In one example implementation, the first network device includes a processing unit and a transceiver unit. The processing unit is configured to encapsulate a message by using an IGP monitoring protocol, to obtain a packet, where the message is a message sent by the first network device to a second network device. The transceiver unit is configured to send the packet to a centralized management apparatus by using an IGP monitoring protocol session.

In one example implementation, the first network device includes a processor, a transceiver, and a memory. The transceiver is configured to: receive and send information, the memory stores a computer executable instruction, the processor is connected to the memory and the transceiver by using a bus, and the processor executes the computer executable instruction stored in the memory, so that the first network device performs the following operations: encapsulating a message by using an IGP monitoring protocol, to obtain a packet, where the message is a message sent by the first network device to a second network device; and sending the packet to a centralized management apparatus by using an IGP monitoring protocol session.

Based on a same inventive concept, for a problem-resolving principle and beneficial effects of the first network device, refer to the method in the second aspect and beneficial effects brought by the method. Therefore, for implementation of the first network device, refer to the implementation of the method. Repeated parts are not described again.

A fifth aspect of the various embodiments provides a computer readable storage medium. The computer readable storage medium stores an instruction. When the instruction is run on a computer, the computer is enabled to perform the method according to the first aspect.

A sixth aspect of the various embodiments provides a computer program product including an instruction. When the computer program product is run on a computer, the computer is enabled to perform the method according to the first aspect.

A seventh aspect of the various embodiments provides a computer readable storage medium. The computer readable storage medium stores an instruction. When the instruction is run on a computer, the computer is enabled to perform the method according to the second aspect.

An eighth aspect of the various embodiments provides a computer program product including an instruction. When the computer program product is run on a computer, the computer is enabled to perform the method according to the second aspect.

BRIEF DESCRIPTION OF DRAWINGS

To describe the technical solutions in the various embodiments or in the background more clearly, the following describes the accompanying drawings required for describing the various embodiments or the background.

FIG. 3 is an example diagram of a protocol message type of an IGP monitoring protocol according to an embodiment of this application;

FIG. 4 is an example diagram of a format of a common message header according to an embodiment of this application;

DESCRIPTION OF EMBODIMENTS

Figure 1:
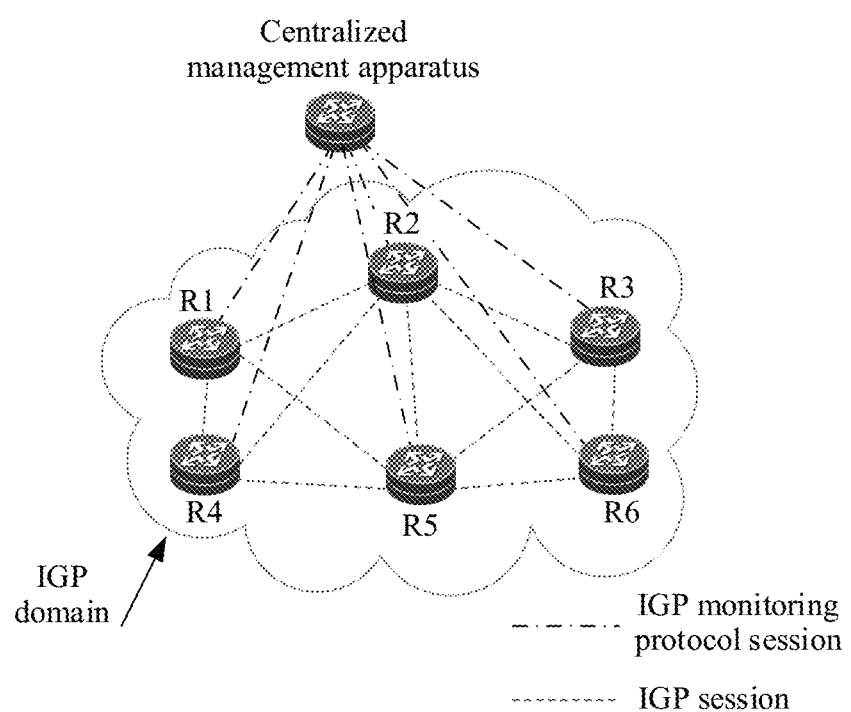
FIG. 1 is a schematic diagram of a network architecture according to an embodiment of this application.

The following describes names or terms used in the various embodiments.

Protocol data unit (PDU): The protocol data unit is a unit of data transmitted between peer layers. A PDU at a physical layer is a data bit, a PDU at a data link layer is a data frame, a PDU at a network layer is a data packet, a PDU at a transport layer is a data segment, and a PDU at another higher layer is a packet. The PDU in the various embodiments is a packet. It should be noted that in the various embodiments, a PDU may be a packet, or a packet may be a PDU.

OSPF: OSPF is a link state routing protocol, and RIP is a distance vector routing protocol. A link is used to connect routers. OSPF is also referred to as an interface status routing protocol. OSPF is used to establish a link state database through a network interface state of router notice and generate a shortest path tree. Each OSPF router uses these shortest paths to construct a routing table. The OSPF router collects connection state information of all routers in a network area in which the OSPF router is located, namely, link state information, and generates a link state database. The router learns of the link state information of all the routers in the area, that is, learns of a topology status of an entire network. The OSPF router uses a shortest path first (SPF) algorithm to independently obtain a router arriving at any destination through calculation.

IS-IS: IS-IS is also a link state routing protocol. Each IS-IS router independently establishes a network topology database to aggregate flooded network information. IS-IS uses a two-level hierarchical structure in a routing domain. A large routing domain is divided into one or more areas (Areas), and three levels of routers are defined as follows: a level-1, a level-2, and a level-1-2. An intra-area route is managed by the level-1 router, and an inter-area route is managed by the level-2 router.

A level-1 router is responsible for an intra-area route. The level-1 router has neighbor relationships with only level-1 and level-1-2 routers that belong to the same area as the level-1 router, and maintains a level-1 link state database. The link state database includes routing information in the area. A packet to be sent to the outside of the area is forwarded to a nearest level-1-2 router. A level-2 router is responsible for an inter-area route. The level-2 router may have neighbor relationships with level-2 and level-1-2 routers in the same area as the level-2 router or other areas, and maintain a level-2 link state database. The link state database includes inter-area routing information.

Working principles of the foregoing two link state routing protocols may include: Each router establishes an adjacency relationship with a neighbor of the router by using a Hello packet; each router sends link state packets (link-state PDU, LSP) LSPs to each neighbor; after receiving the LSPs, each neighbor needs to forward these LSPs to neighbors of the neighbor in sequence; each router needs to store, in a database, backups of the LSPs received by the router, where databases of all routers need to be the same; and based on a topology database, each router uses an SPF algorithm to obtain a shortest path to each network through calculation, and outputs the result to a routing table.

IGP monitoring protocol: The IGP monitoring protocol is a protocol provided in the various embodiments. According to the protocol, a centralized management apparatus may monitor an IGP running request in a network and perform centralized diagnosis. In other words, the IGP monitoring protocol is a protocol between the centralized management apparatus and a router.

IGP monitoring protocol session: The IGP monitoring protocol session is a session based on an IGP monitoring protocol. In other words, the IGP monitoring protocol session is a session between a centralized management apparatus and a router. The router may report IGP information to the centralized management apparatus by using the IGP monitoring protocol session, and the centralized management apparatus may determine fault information in a network through diagnosis based on the IGP information.

The IGP information is information about IGP used between routers, for example, information about OSPF or information about IS-IS. The IGP information may include but is not limited to a link state packet, a Hello packet, routing information, and the like.

It should be noted that the two nouns IGP monitoring protocol and IGP monitoring protocol session do not constitute a limitation on various embodiments, and other names used to describe technical essence of the IGP monitoring protocol and the IGP monitoring protocol session shall also fall within the protection scope of the various embodiments.

In a network using IGP, a fault such as a failure of establishing a connection between a router 1 and a router 2 or a failure of route learning may occur. The router 1 and the router 2 are neighbors to each other in the network.

For example, IGP is IS-IS. A reason why an IS-IS router 1 cannot establish a connection to an IS-IS router 2 may be: A lower-layer fault or a link fault occurs on the IS-IS router 1 or the IS-IS router 2; the IS-IS router 1 or the IS-IS router 2 cannot normally receive and send Hello packets; IP addresses of interfaces of the IS-IS router 1 and the IS-IS router 2 are on different network segments; maximum transmission units (maximum transmission unit, MTU) on the interfaces of the IS-IS router 1 and the IS-IS router 2 are set to be inconsistent; system identifiers configured by the IS-IS router 1 and the IS-IS router 2 are the same; IS-IS levels of the IS-IS router 1 and the IS-IS router 2 do not match; authentication manners on the IS-IS interfaces of the IS-IS router 1 and the IS-IS router 2 do not match; or area addresses of the IS-IS router 1 and the IS-IS router 2 do not match when an IS-IS level-1 neighbor is established.

A reason why route learning of the IS-IS routers fails may be that an LSP is not normally received or a routing prefix is not normally advertised.

Currently, a manual fault diagnosis method is used to determine a fault. To be specific, an administrator enters a command line on each router in a network to query IGP state information and neighbor state information, so as to determine that the network is faulty. The administrator needs to compare information obtained from routers, to determine a fault cause.

The manual fault diagnosis method consumes a long time and affects normal working efficiency of the router. In view of these disadvantages, the various embodiments provide a fault diagnosis method and an apparatus thereof, so that the disadvantages of the manual fault diagnosis method can be overcome, a time consumed for fault diagnosis can be shortened, and impact on normal working efficiency of the router can be reduced.

FIG. 1 is a schematic diagram of a network architecture to which an embodiment of this application is applied. The network architecture shown in FIG. 1 includes a centralized management apparatus and an IGP domain. The IGP domain includes six routers: a router 1 (R1), a router 2 (R2), a router 3 (R3), a router 4 (R4), a router 5 (R5), and a router 6 (R6). It should be noted that device forms and quantities of the centralized management apparatus and the routers shown in FIG. 1 do not constitute a limitation on the various embodiments.

The IGP domain is an autonomous system. The autonomous system includes a group of routers and networks that is controlled by one management agency. In the autonomous system, a router may directly connect to a local area network (local area network, LAN) and also connect to the internet (Internet). In the autonomous system, a plurality of local area networks may be connected to each other through an enterprise backbone network. All routers in an autonomous system are interconnected, and run a same routing protocol. In addition, a same autonomous system number is assigned to all the routers. In the IGP domain, a connection is established between the routers, in other words, an IGP session is established between the routers, and information is transmitted by using the IGP session. In other words, in the IGP domain, the routers use same IGP to transmit the information, for example, use an OSPF protocol to transmit the information.

The centralized management apparatus may be a device independent of the IGP domain. The device may be a router or a switch, may be an application program running on the device, may be a function module integrated into the device, or the like. The centralized management apparatus may be a router in the IGP domain, or may be a function module integrated into the router. The centralized management apparatus may be a controller or a network management device in a software-defined network (software defined network, SDN), may be an application program on the device, may be a function module integrated into the device, or the like.

The centralized management apparatus may establish an IGP monitoring protocol session with each router in the IGP domain, to monitor a running status of IGP between the routers and perform fault diagnosis. In other words, each router reports IGP information to the centralized management apparatus by using the IGP monitoring protocol session, so that the centralized management apparatus monitors the running status of IGP based on the IGP information and performs fault diagnosis.

It should be noted that the name of the centralized management apparatus does not constitute a limitation on various embodiments, or the centralized management apparatus may be referred to as a controller, a centralized management device, a network management device/apparatus, a network management device/apparatus, or the like.

It should be noted that the network device in this embodiment of this application may be a router, a switch, or the like.

Figure 2:
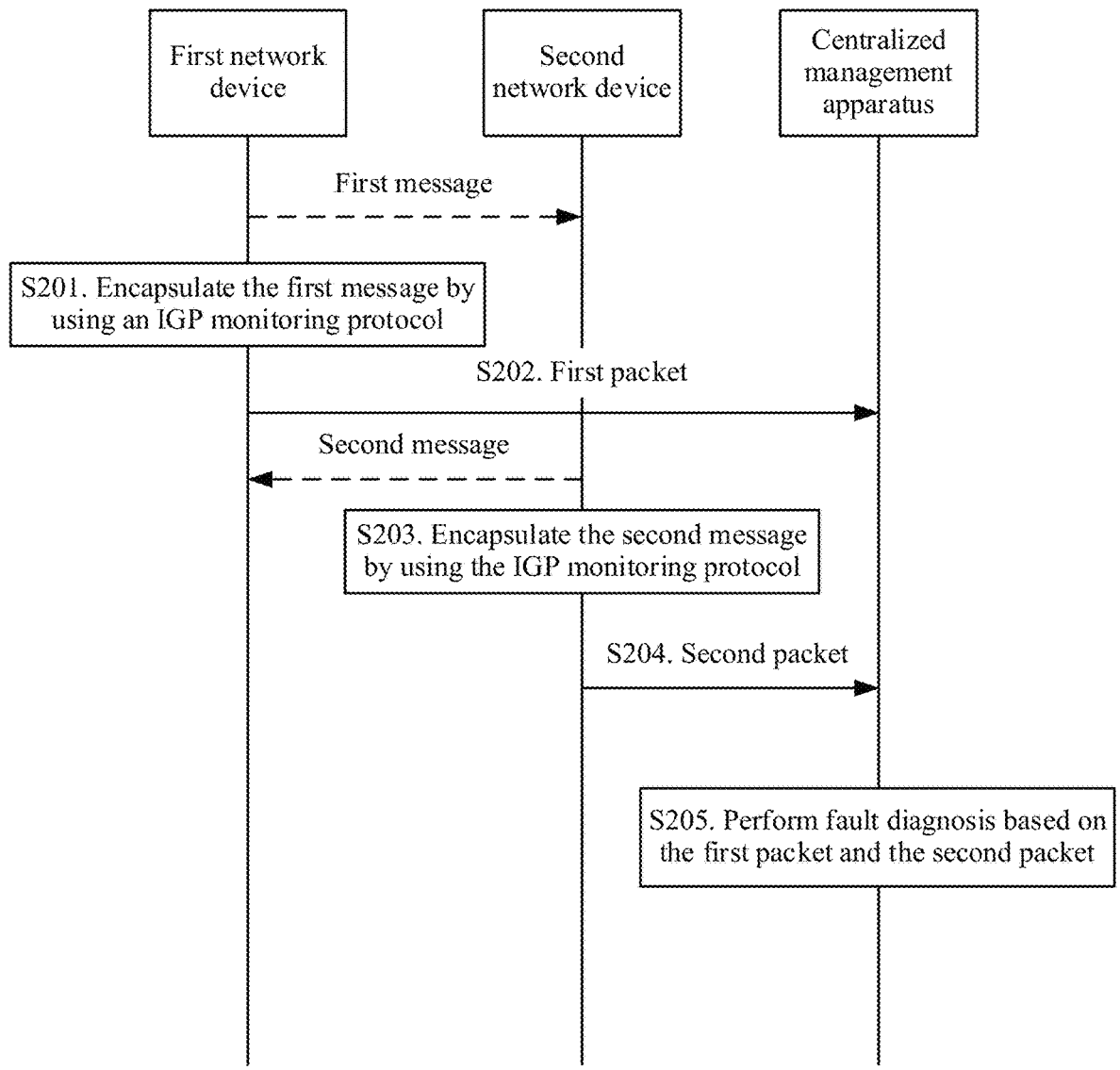
FIG. 2 is a schematic flowchart of a fault diagnosis method according to an embodiment of this application.

FIG. 2 is a schematic flowchart of a fault diagnosis method according to an embodiment of this application. An example in which two network devices interact with a centralized management apparatus is used in the method for description. The method may include but is not limited to the following steps.

Step S201: A first network device encapsulates a first message by using an IGP monitoring protocol, to obtain a first packet.

In one example implementation, before the first network device encapsulates the first message by using the IGP monitoring protocol, or sends the first packet to the centralized management apparatus by using a first IGP monitoring protocol session, the first network device establishes the first IGP monitoring protocol session with the centralized management apparatus.

A process in which the first network device establishes the first IGP monitoring protocol session with the centralized management apparatus may include:

(1) The centralized management apparatus configures an IP address (for example, an IP address 1) used to establish an IGP monitoring protocol session and a transmission control protocol (TCP) port number (for example, a port 1) used for listening. The TCP port number is used by the centralized management apparatus to listen to a TCP connection establishment request sent by the network device. When completing the configuration, the centralized management apparatus enters a state of waiting to establish a connection. A specific method in which the centralized management apparatus configures the information is not limited in this embodiment of this application.

(2) The first network device configures an IP address (an IP address 2) used to establish the IGP monitoring protocol session, the TCP port number (port 1) preconfigured by the centralized management apparatus, and the IP address 1 preconfigured by the centralized management apparatus. In other words, a TCP port number configured by the first network device is the same as the TCP port number configured by the centralized management apparatus for listening. The first network device sends the TCP connection establishment request by using the TCP port number configured by the first network device. A specific method in which the first network device configures the information is not limited in this embodiment of this application.

(3) When completing the configuration, the first network device sends the TCP connection establishment request to the centralized management apparatus. The first network device may send the TCP connection establishment request to the centralized management apparatus by using the TCP port number (port 1). The TCP connection establishment request may include the IP address 2 of the first network device. The TCP connection establishment request is used to establish the first IGP monitoring protocol session.

(4) When receiving the TCP connection establishment request from the first network device, the centralized management apparatus establishes the first IGP monitoring protocol session between the centralized management apparatus and the first network device by using the IP address 1 and the IP address 2.

The first network device encapsulates the first message by using the IGP monitoring protocol, to obtain the first packet. The first message is a message sent by the first network device to a second network device, and the message may have been sent to the second network device, or may be to be sent to the second network device.

The first message may be a neighbor discovery message, may be link state database information, or may be another message.

The neighbor discovery message may be an IGP Hello packet, for example, an IS-IS Hello packet or an OSPF Hello packet. The IS-IS Hello packet is used to establish and maintain a neighbor relationship, and is also referred to as IIH (IS-IS Hello PDUs). Level-1 IS-IS in a broadcast network uses level-1 LAN IIH. Level-2 IS-IS in the broadcast network uses level-2 LAN IIH. Point-to-point (P2P) IIH is used in a non-broadcast network. A packet format of level-1/level-2 LAN IIH is different from a packet format of P2P IIH. Details are not described in this embodiment.

The link state database information includes at least one LSP. The link state database information sent by the first network device to the second network device includes an LSP of the first network device, and further includes LSPs of other network devices. For example, in the network architecture shown in FIG. 1, link state database information sent by the R1 to the R2 includes an LSP of the R1, and further includes an LSP of the R2, an LSP of the R3, an LSP of the R4, an LSP of the R5, and an LSP of the R6. The LSP may be an IS-IS LSP or an OSPF LSP. LSPs included in one piece of link state database information have a same IGP.

The IS-IS LSP is used to exchange link state information. The LSP is classified into a level-1 LSP and a level-2 LSP. The level-1 LSP is transmitted by level-1 IS-IS, and the level-2 LSP is transmitted by level-2 IS-IS. A specific format of the LSP is not described in this embodiment.

The first network device encapsulates the first message based on a protocol message type defined in the IGP monitoring protocol, to obtain the first packet. FIG. 3 is an example diagram of a protocol message type of an IGP monitoring protocol according to an embodiment of this application. It should be noted that only two types of protocol messages are described in FIG. 3 by using examples. In actual application, another type of protocol message may be further included. Details are not listed one by one in this embodiment of this application.

If a first message is link state database information, a first network device encapsulates the first message through a type 0, that is, link state packet monitoring (LSP monitoring), to obtain a first packet. In this case, a packet format of the first packet includes a common message header (common header) and a link state packet (LSP). The first network device may encapsulate all LSPs of the first network device through the type 0, and report all the LSPs to a centralized management apparatus at one time. In other words, the first packet includes all the LSPs of the first network device. When the LSP changes, the first network device may encapsulate the changed LSP through the type 0, and report the changed LSP to the centralized management apparatus. In other words, the first packet includes the changed LSP.

If a first message is a neighbor discovery message, a first network device encapsulates the first message through a type 1, that is, neighbor discovery (neighbor discovery), to obtain a first packet. In this case, a packet format of the first packet includes a common message header (common header) and a Hello packet (Hello PDU). When discovering an active neighbor, the first network device may encapsulate the first message, to obtain the first packet. In this case, the first packet may indicate the discovered active neighbor. Alternatively, when discovering that an active neighbor withdraws from a network, the first network device may encapsulate the first message, to obtain the first packet. In this case, the first packet may indicate the withdrawn neighbor. Alternatively, when discovering that a configuration parameter of a neighbor changes, the first network device may encapsulate the first message, to obtain the first packet. In this case, the first packet may indicate the neighbor whose configuration parameter changes, and the configuration parameter of the neighbor changes.

For a format of the common message header, refer to FIG. 4. FIG. 4 shows a format of a common message header defined in an embodiment of this application. The format includes a version number, a protocol identifier (Protocol-ID), an OSPF neighbor identifier (Neighbor ID)/IS-IS system identifier (System-ID), a message length, and a message type (Message Type). It should be noted that the format of the common message header shown in FIG. 4 is used as an example, and does not constitute a limitation on this embodiment of this application. In actual application, other information may be further included.

The version number is used to identify a version number supported by a current protocol. The protocol identifier is used to identify a type of a currently monitored protocol, which may be one of protocol types such as an IS-IS level 1, an IS-IS level 2, OSPFv2, and OSPFv3. The OSPF neighbor identifier/IS-IS system identifier is determined based on the protocol identifier. If the protocol identifier is related to OSPF, this field is the OSPF neighbor identifier. If the protocol identifier is related to IS-IS, this field is the system identifier.

Step S202: The first network device sends the first packet to the centralized management apparatus by using the first IGP monitoring protocol session. Correspondingly, the centralized management apparatus receives the first packet from the first network device by using the first IGP monitoring protocol session.

When the centralized management apparatus establishes the first IGP monitoring protocol session, the first network device sends the first packet to the centralized management apparatus by using the first IGP monitoring protocol session.

Step S203: The second network device encapsulates a second message by using the IGP monitoring protocol, to obtain a second packet.

Step S204: The second network device sends the second packet to the centralized management apparatus by using a second IGP monitoring protocol session. Correspondingly, the centralized management apparatus receives the second packet from the second network device by using the second IGP monitoring protocol session.

Implementation processes of step S203 and step S204 are similar to those of step S201 and step S202, and a difference lies in that the second IGP monitoring protocol session is a session between the centralized management apparatus and the second network device; and the second message is a message sent by the second network device to the first network device.

It should be noted that the first message and the second message are messages of a same type, for example, both are neighbor discovery messages or both are link state database information. In this case, the first packet and the second packet use a same protocol message type, for example, both use the type 0 or the type 1.

It should be noted that a sequence of step S201 and step S203 is not limited in this embodiment of this application, and the two steps may be or may not be simultaneously performed.

This depends on a specific case.

Step S205: The centralized management apparatus performs fault diagnosis based on the first packet and the second packet.

When receiving the first packet and the second packet, the centralized management apparatus parses the first packet and the second packet, to obtain protocol message types; and performs fault diagnosis based on the first packet and the second packet if the first packet and the second packet use a same protocol message type.

The centralized management apparatus performs fault diagnosis when the first packet and the second packet do not meet a packet rule. The centralized management apparatus performs no processing when the first packet and the second packet meet a packet rule.

In the embodiment shown in FIG. 2, the centralized management apparatus directly performs fault diagnosis without a query instruction entered by an administrator, so that disadvantages of a manual fault diagnosis method can be overcome, a time consumed for fault diagnosis can be shortened, and impact on normal working efficiency of a network device can be reduced.

It should be noted that an example in which the two network devices interact with the centralized management apparatus is used in the embodiment shown in FIG. 2. In actual application, the centralized management apparatus may establish an IGP monitoring protocol session with each network device in an IGP domain, collect a packet sent by each network device, and perform real-time monitoring and fault diagnosis on the network device in the IGP domain based on a protocol message type used by the packet.

The following uses an example in which the first message and the second message are neighbor discovery messages or link state database information for description.

Figure 5:
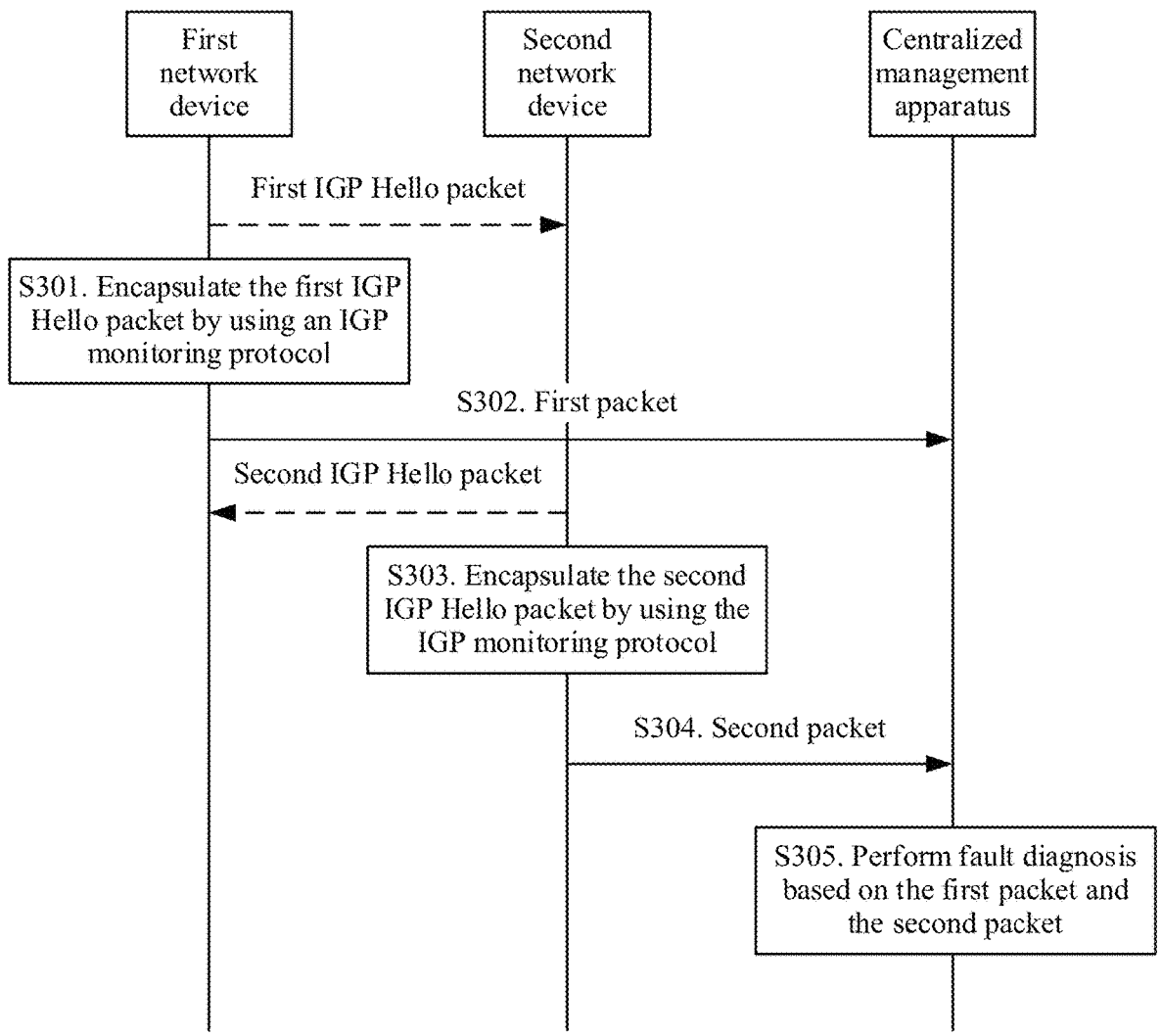
FIG. 5 is an example diagram 1 of a fault diagnosis method according to an embodiment of this application.

FIG. 5 is an example diagram 1 of a fault diagnosis method according to an embodiment of this application. In this example, a first message and a second message are neighbor discovery messages, namely, IGP Hello packets.

Step S301: A first network device encapsulates a first IGP Hello packet by using an IGP monitoring protocol, to obtain a first packet.

With reference to the example diagram shown in FIG. 3, the first network device encapsulates the first IGP Hello packet through a type 1, that is, neighbor discovery (neighbor discovery), to obtain the first packet.

Step S302: The first network device sends the first packet to a centralized management apparatus by using a first IGP monitoring protocol session. Correspondingly, the centralized management apparatus receives the first packet from the first network device by using the first IGP monitoring protocol session.

Step S303: A second network device encapsulates a second IGP Hello packet by using the IGP monitoring protocol, to obtain a second packet.

Step S304: The second network device sends the second packet to the centralized management apparatus by using a second IGP monitoring protocol session. Correspondingly, the centralized management apparatus receives the second packet from the second network device by using the second IGP monitoring protocol session.

Step S305: The centralized management apparatus performs fault diagnosis based on the first packet and the second packet.

The centralized management apparatus performs fault diagnosis when the first packet and the second packet do not meet an IGP connection establishment rule, and may determine, through diagnosis, that there is a fault that a connection between the first network device and the second network device cannot be established, in other words, the first network device cannot establish a connection to the second network device, or the second network device cannot establish a connection to the first network device.

The first IGP Hello packet and the second IGP Hello packet each may carry at least one piece of information such as an IP address, an authentication manner, a system identifier, an IS-IS level, and an MTU value that are on a local interface.

In one example implementation, the first IGP Hello packet carries an IP address 1 of the first network device, and the second IGP Hello packet carries an IP address 2 of the second network device. The centralized management apparatus detects whether the IP address 1 and the IP address 2 are on a same network segment. If the IP address 1 and the IP address 2 are on different network segments, the centralized management apparatus may determine that the first packet and the second packet do not meet the IGP connection establishment rule. In this case, the IGP connection establishment rule may be that IP addresses at two ends of a link need to be on the same network segment.

Further, the centralized management apparatus may determine that a fault cause of an IGP neighbor fault is that the IP addresses of the first network device and the second network device are on the different network segments, so that an administrator can adjust the IP address of the first network device or the second network device. It may be understood that the IP addresses of the first network device and the second network device are on the different network segments, and consequently the connection between the first network device and the second network device cannot be established.

In one example implementation, the first IGP Hello packet carries an authentication manner of the first network device, and the second IGP Hello packet carries an authentication manner of the second network device. The authentication manner is an interface authentication manner. If IGP is an IS-IS protocol, the authentication manner may be an IS-IS interface authentication manner. If IGP is an OSPF protocol, the authentication manner may be an OSPF interface authentication manner. The centralized management apparatus detects whether the authentication manner of the first network device matches the authentication manner of the second network device. If the authentication manner of the first network device does not match the authentication manner of the second network device, the centralized management apparatus may determine that the first packet and the second packet do not meet the IGP connection establishment rule. In this case, the IGP connection establishment rule may be that interface authentication manners at two ends of a link need to be matched.

Further, the centralized management apparatus may determine that a fault cause of an IGP neighbor fault is that the authentication manners of the first network device and the second network device do not match, so that an administrator can adjust the interface authentication manner of the first network device or the second network device. It may be understood that the authentication manners of the first network device and the second network device do not match, and consequently the connection between the first network device and the second network device cannot be established.

In one example implementation, the first IGP Hello packet carries a system identifier of the first network device, and the second IGP Hello packet carries a system identifier of the second network device. The centralized management apparatus detects whether the system identifier of the first network device is the same as the system identifier of the second network device. If the system identifier of the first network device is the same as the system identifier of the second network device, the centralized management apparatus may determine that the first packet and the second packet do not meet the IGP connection establishment rule. In this case, the IGP connection establishment rule may be that system identifiers at two ends of a link need to be different. The system identifier may be a system identifier (system ID) specified in an IS-IS protocol.

Further, the centralized management apparatus may determine that a fault cause of an IGP neighbor fault is that the system identifiers of the first network device and the second network device are the same or conflict, so that an administrator can adjust the system identifier of the first network device or the second network device. It may be understood that the system identifiers of the first network device and the second network device are the same, and consequently the connection between the first network device and the second network device cannot be established.

In one example implementation, the first IGP Hello packet carries an IS-IS level of the first network device, and the second IGP Hello packet carries an IS-IS level of the second network device. The centralized management apparatus detects whether the IS-IS level of the first network device matches the IS-IS level of the second network device. If the IS-IS level of the first network device does not match the IS-IS level of the second network device, the centralized management apparatus may determine that the first packet and the second packet do not meet the IGP connection establishment rule. In this case, the IGP connection establishment rule may be that IS-IS levels at two ends of a link need to be matched. For example, the IS-IS level of the first network device is a level-1, and the IS-IS level of the second network device is a level-2. The level-1 does not match the level-2. The centralized management apparatus may determine that the first packet and the second packet do not meet the IGP connection establishment rule.

Further, the centralized management apparatus may determine that a fault cause of an IGP neighbor fault is that the IS-IS levels of the first network device and the second network device do not match, so that an administrator can adjust the IS-IS level of the first network device or the second network device. It may be understood that the IS-IS levels of the first network device and the second network device do not match, and consequently the connection between the first network device and the second network device cannot be established.

In example implementation, the first IGP Hello packet carries an MTU value of the first network device, and the second IGP Hello packet carries an MTU value of the second network device. The centralized management apparatus detects whether the MTU value of the first network device is the same as the MTU value of the second network device. If the MTU value of the first network device is different from the MTU value of the second network device, the centralized management apparatus may determine that the first packet and the second packet do not meet the IGP connection establishment rule. In this case, the IGP connection establishment rule may be that MTU values at two ends of a link need to be the same.

Further, the centralized management apparatus may determine that a fault cause of an IGP neighbor fault is that the MTU values of the first network device and the second network device are different, so that an administrator can adjust the MTU value of the first network device or the second network device. It may be understood that the MTU values of the first network device and the second network device are different, and consequently the connection between the first network device and the second network device cannot be established.

Further, the centralized management apparatus generates information about adjusting an MTU value if the MTU value of the first network device or the MTU value of the second network device is less than an MTU threshold, and consequently an IGP protocol packet is divided into a plurality of small segments. The information about adjusting an MTU value is used to instruct the administrator to adjust the maximum transmission unit value of the first network device or the second network device. For example, the centralized management apparatus generates and outputs the information about adjusting a maximum transmission unit. When obtaining the information, the administrator queries the maximum transmission unit values of the two network devices, to determine whether to adjust the maximum transmission unit value of the first network device or the second network device, so as to optimize running of IGP.

It should be noted that the foregoing manners are relatively common examples. In actual application, another manner may be further included, and is not listed herein.

When determining that there is the fault that the connection between the first network device and the second network device cannot be established, the centralized management apparatus generates alarm information to indicate the fault, so that an administrator performs corresponding adjustment. The alarm information may carry a fault cause, so that the administrator performs targeted adjustment based on the fault cause.

In the example shown in FIG. 5, the centralized management apparatus collects a packet obtained by performing encapsulation through the type 0, performs fault diagnosis, and may further determine the fault cause through diagnosis, so that the administrator correspondingly adjusts a corresponding network device.

Figure 6:
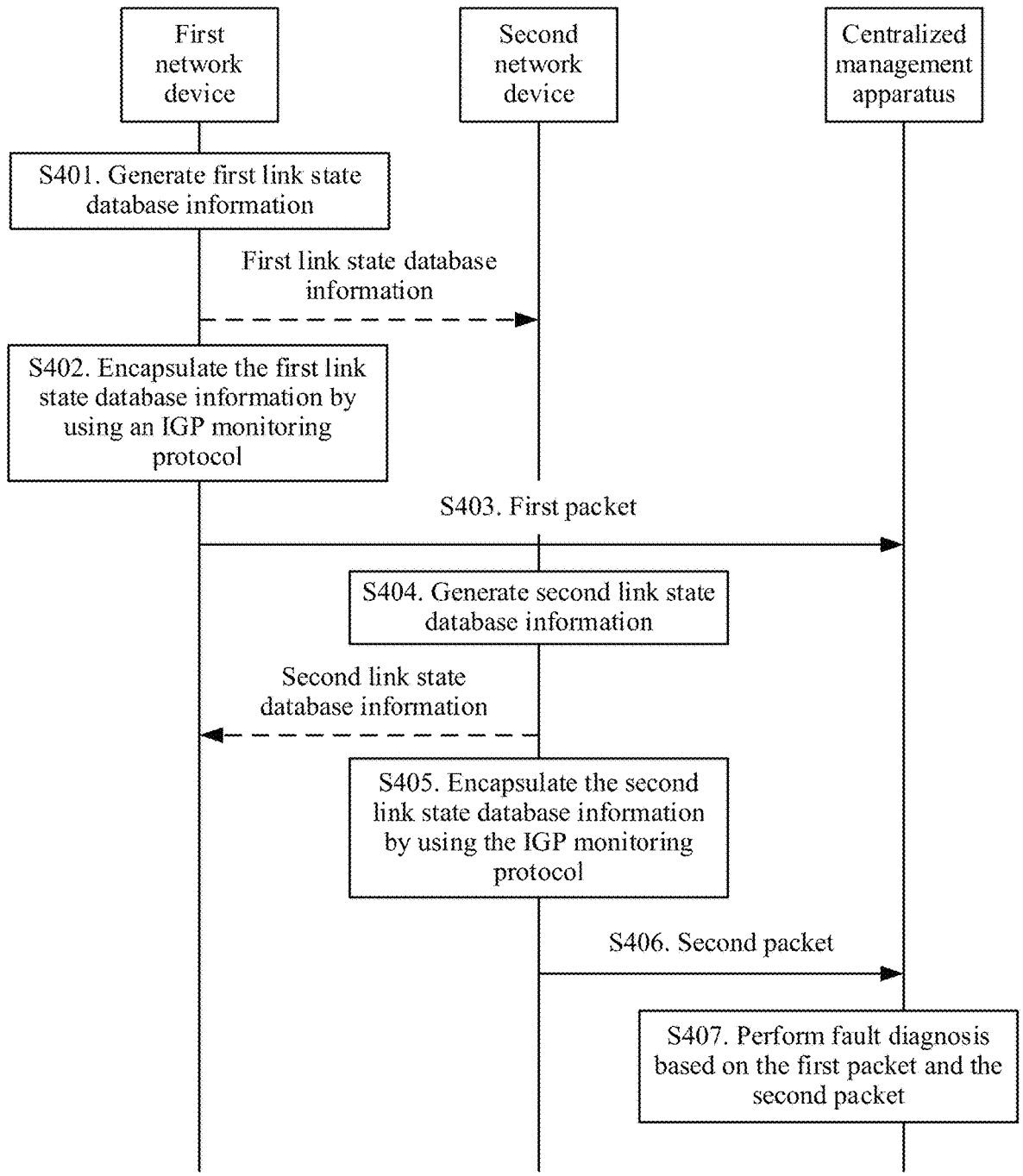
FIG. 6 is an example diagram 2 of a fault diagnosis method according to an embodiment of this application.

FIG. 6 is an example diagram 2 of a fault diagnosis method according to an embodiment of this application. In this example, a first message and a second message are link state database information.

Step S401: A first network device generates first link state database information.

The first network device aggregates an LSP generated by the first network device and an LSP received from another network device, to generate an LSP database, for example, an LSP DB 1. The LSP database is referred to as the first link state database information.

It may be understood that the first link state database information includes the LSP generated by the first network device and the LSP received from another network device. In other words, the first link state database information includes at least one LSP. It should be noted that the name of the link state database information does not constitute a limitation on the various embodiments, and another name used to describe the link state database information including the at least one LSP shall fall within the protection scope of the various embodiments. For example, the link state database information is referred to as link state information or link state packet information.

For example, in the schematic diagram of the network architecture shown in FIG. 1, it is assumed that the first network device is the R1, a second network device is the R2, and first link state database information sent by the R1 to the R2 includes six LSPs, that is, an LSP 1 generated by the R1, an LSP 2 generated by the R2, an LSP 3 generated by the R3, an LSP 4 generated by the R4, an LSP 5 generated by the R5, and an LSP 6 generated by the R6.

When generating the first link state database information, the first network device may synchronize the first link state database information to the second network device. In other words, the first network device sends the first link state database information, namely, the first message, to the second network device.

When receiving the first link state database information, the second network device may update second link state database information generated by the second network device.

If there is no route learning fault between the first network device and the second network device, the first link state database information is consistent with the second link state database information. "Consistent" means that quantities of included LSPs are consistent, same LSPs are included, and content included in the same LSPs needs to be the same. For example, the first link state database information includes an LSP 1 and an LSP 2, and the second link state database information includes the LSP 1 and the LSP 2. In addition, content of the LSPs 1 included in the two pieces of information is the same, and content included in the LSPs 2 is the same. In this case, the first link state database information is consistent with the second link state database information.

Step S402: The first network device encapsulates the first link state database information by using an IGP monitoring protocol, to obtain a first packet.

With reference to the example diagram shown in FIG. 3, the first network device encapsulates the first link state database information through a type 0, that is, link state packet monitoring (LSP monitoring), to obtain the first packet.

Step S403: The first network device sends the first packet to a centralized management apparatus by using a first IGP monitoring protocol session. Correspondingly, the centralized management apparatus receives the first packet from the first network device by using the first IGP monitoring protocol session.

Step S404: The second network device generates the second link state database information.

Step S405: The second network device encapsulates the second link state database information by using the IGP monitoring protocol, to obtain a second packet.

Step S406: The second network device sends the second packet to the centralized management apparatus by using a second IGP monitoring protocol session. Correspondingly, the centralized management apparatus receives the second packet from the second network device by using the second IGP monitoring protocol session.

Step S407: The centralized management apparatus performs fault diagnosis based on the first packet and the second packet.

In the example shown in FIG. 6, the centralized management apparatus performs fault diagnosis when the first packet and the second packet do not meet a packet rule, and may determine, through diagnosis, that there is the route learning fault. The route learning fault is that route learning of the first network device or the second network device fails.

The packet rule is that link state database information at two ends of a link needs to be consistent. The link state database information includes at least one link state packet.

In one example implementation, if at least one link state packet included in the first packet does not include at least one link state packet included in the second packet, or at least one link state packet included in the second packet does not include at least one link state packet included in the first packet, in other words, the at least one link state packet sent by one network device cannot be found on the other network device, the centralized management apparatus determines that the first packet and the second packet do not meet the packet rule. For example, if the first packet includes an LSP 1 and an LSP 2, and the LSP 1 is a packet generated by the first network device, but the second packet does not include the LSP 1, the centralized management apparatus determines that the first packet and the second packet do not meet the packet rule.

Further, the centralized management apparatus may determine that a fault cause of the route learning fault is that a link state packet received by the first network device or the second network device is incorrect, in other words, the first network device or the second network device fails to receive the link state packet. For example, if the first packet includes an LSP 1 and an LSP 2, and the LSP 1 is a packet generated by the first network device, but the second packet does not include the LSP 1, the centralized management apparatus may determine that the fault cause is that the link state packet received by the second network device is incorrect, in other words, the second network device does not receive the link state packet 1. In other words, the second network device does not receive the link state packet 1 sent by the first network device to the second network device.

In one example implementation, if at least one link state packet included in the first packet does not match at least one link state packet included in the second packet, the centralized management apparatus determines that the first packet and the second packet do not meet the packet rule.

If an LSP 1 sent by the first network device includes an IP prefix P1, in other words, the LSP 1 of the first packet carries the IP prefix P1, but when the first network device synchronizes the LSP 1 to the second network device, the IP prefix P1 is not carried in the LSP 1, in other words, the LSP 1 of the second packet does not carry the IP prefix P1. In this case, the centralized management apparatus may determine that the at least one link state packet included in the first packet does not match the at least one link state packet included in the second packet.

If an LSP 1 sent by the first network device includes an IP prefix P1, in other words, the LSP 1 of the first packet carries the IP prefix P1, but when the first network device synchronizes the LSP 1 to the second network device, the LSP 1 carries an IP prefix P2 in addition to the IP prefix P1, in other words, the LSP 1 of the second packet carries the IP prefixes P1 and P2. In this case, the centralized management apparatus may determine that the at least one link state packet included in the first packet does not match the at least one link state packet included in the second packet.

Further, the centralized management apparatus may determine that a fault cause of the route learning fault is that a routing prefix sent by the first network device or the second network device is incorrect. The routing prefix may be an IP prefix. For example, if the LSP 1 of the first packet carries the IP prefix P1, and the LSP of the second packet does not carry the IP prefix P1 or carries the IP prefix P1 and the IP prefix P2, the centralized management apparatus may determine that the fault cause is that the routing prefix sent by the first network device is incorrect.

It should be noted that the foregoing manners are relatively common examples. In actual application, another manner may be further included, and is not listed herein.

When determining that there is the route learning fault, the centralized management apparatus generates alarm information to indicate the fault, so that an administrator can handle the fault in time.

In example implementation, when there is a relatively large quantity of LSPs included in the link state database information, the packet may be divided into a plurality of segments for sending. In this case, the centralized management apparatus may perform targeted collection based on protocol message types used by the segments, to help perform IGP monitoring and fault diagnosis. For example, the first packet obtained by encapsulating the first link state database information through the type 1 is divided into three segments. In this case, the centralized management apparatus collects information about the type 1, to perform IGP monitoring and fault diagnosis.

In the example shown in FIG. 5, the centralized management apparatus may collect a packet obtained by performing encapsulation through the type 1, performs route learning fault diagnosis, and may further determine the fault cause through diagnosis, so that the administrator can handle the fault in time.

It should be noted that the examples shown in FIG. 5 and FIG. 6 are used as examples. In actual application, the centralized management apparatus may further collect a packet obtained by performing encapsulation by using another protocol message type, to perform fault diagnosis.

The foregoing describes in detail the methods in the various embodiments. The following provides apparatuses in various embodiments.

Figure 7:
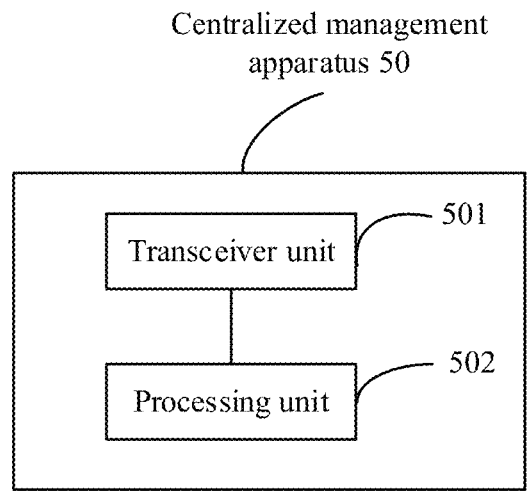
FIG. 7 is a schematic diagram of a logical structure of a centralized management apparatus according to an embodiment of this application.

FIG. 7 is a schematic diagram of a logical structure of a centralized management apparatus according to an embodiment of this application. The centralized management apparatus 50 may include a transceiver unit 501 and a processing unit 502.

The transceiver unit 501 is configured to receive a first packet from a first network device by using a first interior gateway protocol IGP monitoring protocol session. The first packet includes a first message sent by the first network device to a second network device.

The transceiver unit 501 is further configured to receive a second packet from the second network device by using a second IGP monitoring protocol session. The second packet includes a second message sent by the second network device to the first network device, and a message type of the second message is the same as that of the first message.

The processing unit 502 is configured to perform fault diagnosis based on the first packet and the second packet.

It should be noted that the transceiver unit 501 is configured to perform step S202 and step S204 in the embodiment shown in FIG. 2, and the processing unit 502 is configured to perform step S205 in the embodiment shown in FIG. 2. For details, refer to the specific descriptions in the embodiment shown in FIG. 2. The details are not described herein again.

In example implementation, the processing unit 502 is specifically configured to perform fault diagnosis when the first packet and the second packet do not meet a packet rule.

In example implementation, the first message and the second message are neighbor discovery messages, and the neighbor discovery message includes at least one of an authentication manner, a system identifier, an intermediate system to intermediate system IS-IS level, and a maximum transmission unit value. The packet rule is an IGP connection establishment rule, and the IGP connection establishment rule includes a rule that authentication manners at two ends of a link need to be matched, a rule that system identifiers at the two ends of the link need to be different, a rule that IS-IS levels at the two ends of the link need to be matched, and a rule that maximum transmission unit values at the two ends of the link need to be the same.

The processing unit 502 is further configured to: if an authentication manner of the first network device does not match an authentication manner of the second network device, determine that the first packet and the second packet do not meet the packet rule.

The processing unit 502 is further configured to: if a system identifier of the first network device is the same as a system identifier of the second network device, determine that the first packet and the second packet do not meet the packet rule.

The processing unit 502 is further configured to: if an IS-IS level of the first network device does not match an IS-IS level of the second network device, determine that the first packet and the second packet do not meet the packet rule.

The processing unit 502 is further configured to: if a maximum transmission unit value of the first network device is different from a maximum transmission unit value of the second network device, determine that the first packet and the second packet do not meet the packet rule.

In example implementation, the processing unit 502 is specifically configured to determine a fault that a connection between the first network device and the second network device cannot be established.

If the authentication manner of the first network device does not match the authentication manner of the second network device, the processing unit 502 is specifically configured to determine that a fault cause of the fault is that the authentication manner of the first network device does not match the authentication manner of the second network device.

If the system identifier of the first network device is the same as the system identifier of the second network device, the processing unit 502 is specifically configured to determine that a fault cause of the fault is that the system identifier of the first network device is the same as the system identifier of the second network device.

If the IS-IS level of the first network device does not match the IS-IS level of the second network device, the processing unit 502 is specifically configured to determine that a fault cause of the fault is that the IS-IS level of the first network device does not match the IS-IS level of the second network device.

If the maximum transmission unit value of the first network device is different from the maximum transmission unit value of the second network device, the processing unit 502 is specifically configured to determine that a fault cause of the fault is that the maximum transmission unit value of the first network device is different from the maximum transmission unit value of the second network device.

In example implementation, the processing unit 502 is further configured to generate alarm information. The alarm information is used to indicate that there is the fault that the connection between the first network device and the second network device cannot be established.

In example implementation, the processing unit 502 is further configured to generate information about adjusting a maximum transmission unit value if the maximum transmission unit values of the first network device and the second network device do not meet the IGP connection establishment rule, and the maximum transmission unit value of the first network device or the second network device is less than a maximum transmission unit threshold. The information about adjusting a maximum transmission unit value is used to instruct an administrator to adjust the maximum transmission unit value of the first network device or the second network device.

In example implementation, the first message and the second message are link state database information, and the link state packet database information includes at least one link state packet.

The processing unit 502 is further configured to: if at least one link state packet included in the first packet is inconsistent with at least one link state packet included in the second packet, determine that the first packet and the second packet do not meet the packet rule.

In example implementation, the processing unit 502 is specifically configured to determine that there is a route learning fault. The route learning fault is that route learning of the first network device or the second network device fails.

If the at least one link state packet included in the first packet does not match the at least one link state packet included in the second packet, the processing unit 502 is specifically configured to determine that a fault cause of the route learning fault is that a routing prefix sent by the first network device or the second network device is incorrect.

If the at least one link state packet included in the first packet does not include the at least one link state packet included in the second packet, or the at least one link state packet included in the second packet does not include the at least one link state packet included in the first packet, the processing unit 502 is specifically configured to determine that a fault cause of the route learning fault is that a link state packet received by the first network device or the second network device is incorrect.

In example implementation, the processing unit 502 is further configured to generate alarm information. The alarm information is used to indicate that there is the route learning fault.

In example implementation, the processing unit 502 is further configured to configure a first IP address used to establish an IGP monitoring protocol session and a TCP port number.

The transceiver unit 501 is further configured to receive a TCP connection establishment request from the first network device by using the TCP port number. The TCP connection establishment request includes a second IP address that is used to establish the IGP monitoring protocol session and that is configured by the first network device.

The processing unit 502 is further configured to establish the first IGP monitoring protocol session.

The centralized management apparatus 50 may implement a function of the centralized management apparatus in the foregoing method embodiment. For detailed processes performed by the units in the centralized management apparatus 50, refer to the steps performed by the centralized management apparatus in the foregoing method embodiment. Details are not described herein again.

Figure 8A:
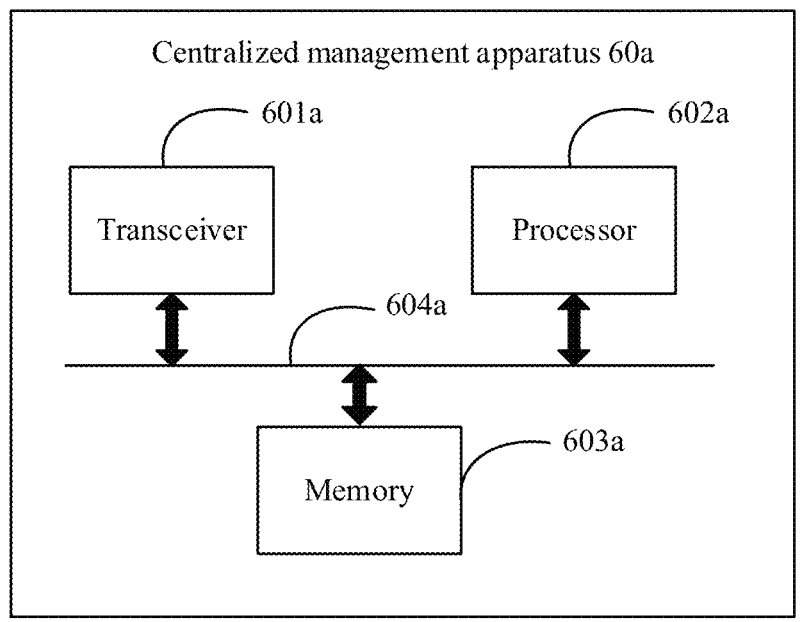
FIG. 8a is a simplified schematic diagram of a centralized entity structure of a centralized management apparatus according to an embodiment of this application.

FIG. 8a is a simplified schematic diagram of a centralized entity structure of a centralized management apparatus according to an embodiment of this application. The centralized management apparatus 60a includes a transceiver 601a, a processor 602a, and a memory 603a. The transceiver 601a, the processor 602a, and the memory 603a may be connected to each other by using a bus 604a, or may be connected to each other in another manner. A related function implemented by the transceiver unit 501 shown in FIG. 7 may be implemented by the transceiver 601a. A related function implemented by the processing unit 502 shown in FIG. 7 may be implemented by the processor 602a.

The transceiver 601a is configured to: send data and/or signaling, and receive data and/or signaling. In this embodiment of this application, the transceiver 601a is configured to receive a packet, data information, and the like, for example, perform step S202 and step S204 in the embodiment shown in FIG. 2.

The processor 602a may include one or more processors, for example, include one or more central processing units (CPU). When the processor 602a is a CPU, the CPU may be a single-core CPU or a multi-core CPU. In this embodiment of this application, the processor 602a is configured to perform related content of packet processing in the foregoing method embodiment, for example, perform step S205 in the embodiment shown in FIG. 2.

The memory 603a includes but is not limited to a random access memory (RAM), a read-only memory (ROM), an erasable programmable read-only memory (EPROM), or a compact disc read-only memory (CD-ROM). The memory 603a is configured to store a related instruction and data. The memory 603a is configured to store program code and data that are of the centralized management apparatus 60a.

Figure 8B:
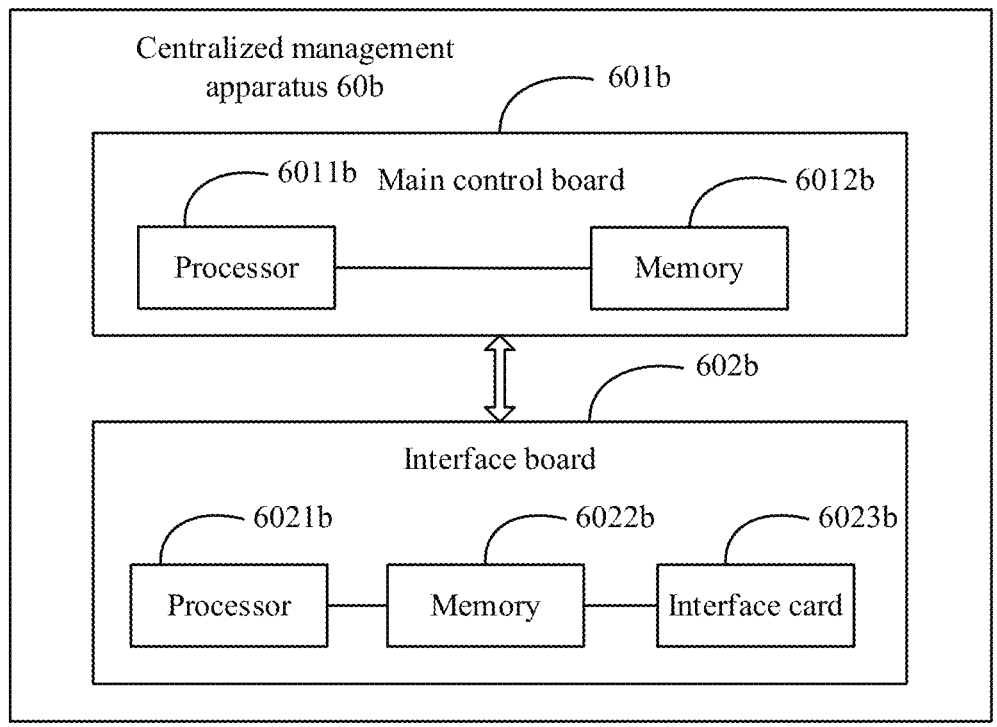
FIG. 8b is a simplified schematic diagram of a distributed entity structure of a centralized management apparatus according to an embodiment of this application.

FIG. 8b is a simplified schematic diagram of a distributed entity structure of a centralized management apparatus according to an embodiment of this application. The centralized management apparatus 60b includes a main control board 601b and an interface board 602b.

The main control board 601b includes a processor 6011b and a memory 6012b. In this embodiment of this application, the main control board 601b is configured to process a packet, for example, perform step S205 in the embodiment shown in FIG. 2. The packet may be specifically processed by the processor 6011b. The memory 6012b stores a related instruction and data that are used by the processor 6011b to process the packet.

The interface board 602b includes a processor 6021b, a memory 6022b, and an interface card 6023b. In this embodiment of this application, the interface board 602b is configured to receive a packet, for example, perform step S202 and step S204 in the embodiment shown in FIG. 2. The packet may be specifically received by the interface card 6023b. The processor 6021b is configured to control the interface card 6023b to receive the packet. The memory 6022b stores a related instruction and data that are used by the processor 6021b to control the interface card 6023b to receive the packet.

It may be understood that FIG. 8a and FIG. 8b merely show simplified designs of the centralized management apparatus. In actual application, the centralized management apparatus may further include other necessary components, including but not limited to any quantity of transceivers, processors, controllers, memories, communications units, and the like. All apparatuses that can implement this application fall within the protection scope of this application.

It should be noted that the centralized management apparatus shown in FIG. 7, FIG. 8*a*, or FIG. 8*b* may be a router or a switch independent of an IGP domain, or may be a function module integrated into the router or the switch.

Figure 9:
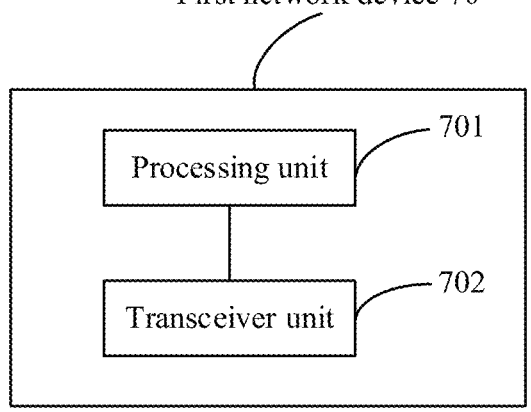
FIG. 9 is a schematic diagram of a logical structure of a first network device according to an embodiment of this application.

FIG. 9 is a schematic diagram of a logical structure of a first network device according to an embodiment of this application. The first network device 70 may include a processing unit 701 and a transceiver unit 702.

The processing unit 701 is configured to encapsulate a message by using an IGP monitoring protocol, to obtain a packet. The message is a message sent by the first network device to a second network device.

The transceiver unit 702 is configured to send the packet to a centralized management apparatus by using an IGP monitoring protocol session.

It should be noted that the processing unit 701 is configured to perform step S201 in the embodiment shown in FIG. 2, and the transceiver unit 702 is configured to perform step S202 in the embodiment shown in FIG. 2. For details, refer to the specific descriptions in the embodiment shown in FIG. 2. The details are not described herein again.

In example implementation, the processing unit 701 is further configured to configure a second IP address used to establish the IGP monitoring protocol session, and a first IP address used to establish the IGP monitoring protocol session and a TCP port number that are configured by the centralized management apparatus.

The transceiver unit 702 is further configured to send a TCP connection establishment request to the centralized management apparatus by using the TCP port number. The TCP connection establishment request includes the second IP address, and the TCP connection establishment request is used to establish the IGP monitoring protocol session.

The first network device 70 may implement a function of the first network device in the foregoing method embodiment. For detailed processes performed by the units in the first network device 70, refer to the steps performed by the first network device in the foregoing method embodiment. Details are not described herein again.

Figure 10:
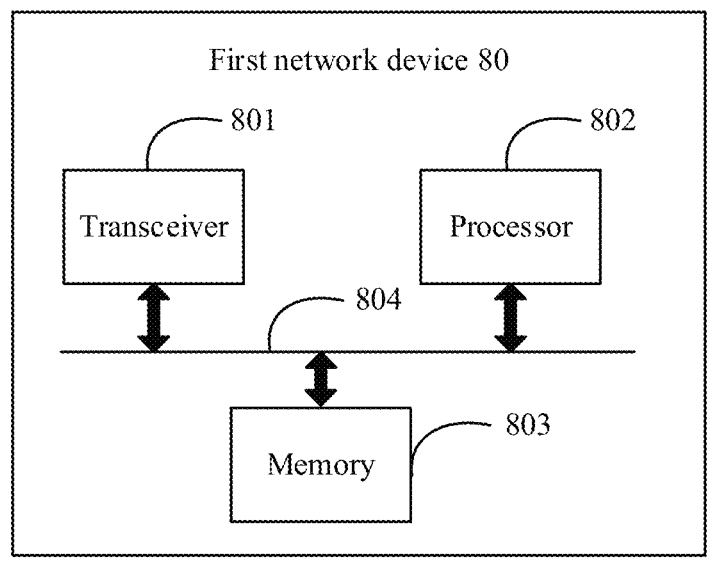
FIG. 10 is a simplified schematic diagram of an entity structure of a first network device according to an embodiment of this application.

FIG. 10 is a simplified schematic diagram of an entity structure of a first network device according to an embodiment of this application. The first network device 80 includes a transceiver 801, a processor 802, and a memory 803. The transceiver 801, the processor 802, and the memory 803 may be connected to each other by using a bus 804, or may be connected to each other in another manner. A related function implemented by the processing unit 701 shown in FIG. 9 may be implemented by the processor 802. A related function implemented by the transceiver unit 702 shown in FIG. 9 may be implemented by the transceiver 801.

The transceiver 801 is configured to: send data and/or signaling, and receive data and/or signaling. In this embodiment of this application, the transceiver 801 is configured to send a packet, data information, and the like, for example, perform step S202 in the embodiment shown in FIG. 2.

The processor 802 may include one or more processors, for example, include one or more CPUs. When the processor 802 is a CPU, the CPU may be a single-core CPU or a multi-core CPU. In this embodiment of this application, the processor 802 is configured to perform step S201 in the embodiment shown in FIG. 2.

The memory 803 includes but is not limited to a RAM, a ROM, an EPROM, or a CD-ROM. The memory 803 is configured to store a related instruction and data. The memory 803 is configured to store program code and data that are of the first network device 80.

It may be understood that FIG. 10 merely shows a simplified design of the first network device. In actual application, the first network device may further include other necessary components, including but not limited to any quantity of transceivers, processors, controllers, memories, communications units, and the like. All apparatuses that can implement this application fall within the protection scope of this application.

It should be noted that the first network device shown in FIG. 9 or FIG. 10 may be any router in an IGP domain.

An embodiment of this application further provides a fault diagnosis system, including a centralized management apparatus and at least two network devices.

A person of ordinary skill in the art may understand that all or some of the procedures of the methods in the embodiments may be implemented by a computer program instructing related hardware. The program may be stored in a computer readable storage medium. When the program is executed, the procedures of the method embodiments may be included. The foregoing storage medium includes any medium that can store program code such as a ROM, a random access memory RAM, a magnetic disk, or an optical disc. Therefore, another embodiment of this application provides a computer readable storage medium. The computer readable storage medium stores an instruction. When the instruction is run on a computer, the computer is enabled to perform the methods in the foregoing aspects.

Another embodiment further provides a computer program product including an instruction. When the computer program product is run on a computer, the computer is enabled to perform the methods in the foregoing aspects.

A person of ordinary skill in the art may be aware that units and algorithm steps in the examples described with reference to the embodiments disclosed in this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing described system, apparatus, and unit, reference may be made to a corresponding process in the foregoing method embodiments. Details are not described herein again.

In the several embodiments provided in this application, it should be understood that the disclosed system, apparatus, and method may be implemented in another manner. For example, the foregoing described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the various embodiments may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on a computer, the procedures or functions according to the embodiments of the present invention are completely or partially generated. The computer may be a general-purpose computer, a dedicated computer, a computer network, or another programmable apparatus. The computer instructions may be stored in a computer readable storage medium, or may be transmitted by using a computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method, comprising:
   receiving, by a centralized management apparatus, a first packet from a first network device through a first Interior Gateway Protocol (IGP) monitoring protocol (IGP-MP) session, wherein the first packet comprises a first link state database sent by the first network device to a second network device, the link state database including a link state packet;
   storing, by the centralized management apparatus, the first link state database;
   receiving, by the centralized management apparatus, a second packet from a second network device through a second IGP-MP session, wherein the second packet comprises a second link state database received by the second network device from the first network device;
   storing, by the centralized management apparatus, the second link state database; and
   performing, by the centralized management apparatus, a fault diagnosis according to the first link state database and the second link state database when the first packet and the second packet do not meet a packet rule.

2. The method according to claim 1, wherein the first IGP-MP session is based on transmission control protocol (TCP).

3. The method according to claim 1, wherein the first IGP-MP session and the second IGP-MP session have different TCP ports.

4. The method according to claim 1, wherein before receiving, by the centralized management apparatus, the first packet from the first network device through the first IGP-MP session, the method further comprises:
   configuring, by the centralized management apparatus, a transmission control protocol (TCP) port number and a first IP address used to establish an IGP-MP session
   receiving, by the centralized management apparatus, a TCP connection establishment request from the first network device by using the TCP port number, wherein the TCP connection establishment request comprises a second IP address that is used to establish the first IGP-MP session and that is configured by the first network device; and
   establishing, by the centralized management apparatus, the first IGP-MP session.

5. A method, comprising:
   generating, by a first network device, a packet comprising a first link state database sent by the first network device to a second network device, the link state database including a link state packet; and
   sending, by the first network device, the packet to a centralized management apparatus through a first IGP-MP session;
   receiving, by the centralized management apparatus, the packet and a second packet from a second network device through a second IGP-MP session, wherein the second packet comprises a second link state database received by the second network device from the first network device;
   storing, by the centralized management apparatus, the second link state database; and
   performing, by the centralized management apparatus, a fault diagnosis according to the first link state database and the second link state database when the first packet and the second packet do not meet a packet rule.

6. The method according to claim 5, wherein the first IGP-MP session is based on transmission control protocol (TCP).

7. The method according to claim 5, wherein the method further comprises:
   configuring, by the first network device, a first IP address used to establish the first IGP-MP session, a second IP address also used to establish the second IGP-MP session, and a TCP port number; and
   sending, by the first network device, a TCP connection establishment request to the centralized management apparatus by using the TCP port number, wherein the TCP connection establishment request comprises the first IP address, and the TCP connection establishment request is used to establish the first IGP-MP session.

8. A centralized management apparatus, comprising:
   at least one processor; and one or more memories coupled to the at least one processor and storing instructions for execution by the at least one processor, the instructions instruct the at least one processor to cause the centralized management apparatus to:
   receive a first packet from a first network device through a first Interior Gateway Protocol (IGP) monitoring protocol IGP-MP session, wherein the first packet comprises a first link state database sent by the first network device to the second network device, the link state database including a link state packet; and
   store, by the centralized management apparatus, the first link state database;
   receiving, by the centralized management apparatus, a second packet from a second network device through a second IGP-MP session, wherein the second packet comprises a second link state database received by the second network device from the first network device;

storing, by the centralized management apparatus, the second link state database; and performing, by the centralized management apparatus, a fault diagnosis according to the first link state database and the second link state database when the first packet and the second packet do not meet a packet rule.

9. The method according to claim 8, wherein the first IGP-MP session is based on transmission control protocol (TCP).

10. The method according to claim 8, wherein the first IGP-MP session and the second IGP-MP session have different TCP ports.

11. The apparatus according to claim 8, wherein the instructions further instruct the at least one processor to cause the centralized management apparatus to:
configure a first IP address used to establish a TCP port number and the first IGP-MP session;
receive a TCP connection establishment request from the first network device by using the TCP port number, wherein the TCP connection establishment request comprises a second IP address that is also used to establish the first IGP-MP session and that is also configured by the first network device; and
establish the first IGP-MP session.

12. A first network device, comprising:
at least one processor; and
one or more memories coupled to the at least one processor and storing instructions for execution by the at least one processor, the instructions instruct the at least one processor to cause the first network device to:
generate a packet, wherein the packet comprises a first link state database sent by the first network device to a second network device, the link state database including a link state packet; and
send the packet to a centralized management apparatus through a first IGP-MP session;
sending, to the centralized management apparatus, the packet and a second packet from a second network device through a second IGP-MP session, wherein the second packet comprises a second link state database received by the second network device from the first network device;
wherein the centralized management apparatus stores the second link state database, and wherein the centralized management apparatus performs a fault diagnosis according to the first link state database and the second link state database when the first packet and the second packet do not meet a packet rule.

13. The first network device according to claim 12, wherein the first IGP-MP session is based on transmission control protocol (TCP).

14. The first network device according to claim 12, wherein the instructions instruct the at least one processor to further cause the first network device to:
configure a first IP address used to establish the first IGP-MP session, a second IP address also used to establish the second IGP-MP session, and a TCP port number; and
send a TCP connection establishment request to the centralized management apparatus by using the TCP port number, wherein the TCP connection establishment request comprises the first IP address, and the TCP connection establishment request is used to establish the first IGP-MP session.

* * * * *

UNITED STATES PATENT AND TRADEMARK OFFICE
CERTIFICATE OF CORRECTION

PATENT NO. : 12,052,165 B2
APPLICATION NO. : 17/947782
DATED : July 30, 2024
INVENTOR(S) : Shunwan Zhuang et al.

It is certified that error appears in the above-identified patent and that said Letters Patent is hereby corrected as shown below:

In the Claims

In Column 28, in Claim 4, at Line 7, delete "session" and insert -- session; --.

Signed and Sealed this
Twenty-ninth Day of October, 2024

Katherine Kelly Vidal
*Director of the United States Patent and Trademark Office*